(12) United States Patent
Baba et al.

(10) Patent No.: US 9,027,957 B2
(45) Date of Patent: May 12, 2015

(54) OCCUPANT PROTECTION APPARATUS AND OCCUPANT PROTECTION METHOD

(75) Inventors: Noriyoshi Baba, Tokyo (JP); Isamu Nagasawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 78 days.

(21) Appl. No.: 13/402,213

(22) Filed: Feb. 22, 2012

(65) Prior Publication Data

US 2012/0217730 A1 Aug. 30, 2012

(30) Foreign Application Priority Data

Feb. 28, 2011 (JP) ................................. 2011-042650

(51) Int. Cl.
*B60R 21/231* (2011.01)
*B60R 21/00* (2006.01)

(52) U.S. Cl.
CPC ... *B60R 21/23138* (2013.01); *B60R 2021/0039* (2013.01); *B60R 2021/23146* (2013.01)

(58) Field of Classification Search
CPC B60R 21/23; B60R 21/231; B60R 21/23138; B60R 21/233
USPC ..................... 280/729, 730.1, 730.2
See application file for complete search history.

(56) References Cited

U.S. PATENT DOCUMENTS

| 5,575,497 | A | * | 11/1996 | Suyama et al. | 280/730.1 |
|---|---|---|---|---|---|
| 5,913,536 | A | * | 6/1999 | Brown | 280/730.2 |
| 6,142,521 | A | | 11/2000 | Shephard | |
| 6,158,767 | A | | 12/2000 | Sinnhuber | |
| 6,428,041 | B1 | * | 8/2002 | Wohllebe et al. | 280/736 |
| 7,048,300 | B2 | | 5/2006 | Honda et al. | |
| 7,264,269 | B2 | | 9/2007 | Gu et al. | |
| 7,461,862 | B2 | * | 12/2008 | Hasebe et al. | 280/743.2 |
| 7,475,904 | B2 | * | 1/2009 | Hofmann et al. | 280/739 |
| 7,549,672 | B2 | * | 6/2009 | Sato et al. | 280/730.2 |
| 7,594,678 | B2 | | 9/2009 | Schedler | |
| 7,611,164 | B2 | | 11/2009 | Kai et al. | |
| 7,618,057 | B2 | * | 11/2009 | Pinsenschaum et al. | 280/730.2 |
| 7,661,702 | B2 | | 2/2010 | Ochiai et al. | |
| 7,681,907 | B2 | | 3/2010 | Svenbrant et al. | |
| 7,918,482 | B2 | * | 4/2011 | Sugimoto et al. | 280/729 |
| 7,946,616 | B2 | | 5/2011 | Ochiai et al. | |
| 7,988,187 | B2 | | 8/2011 | Yamamura et al. | |
| 8,186,708 | B2 | | 5/2012 | Zhou et al. | |
| 8,322,747 | B2 | * | 12/2012 | Shankar | 280/729 |
| 2003/0178831 | A1 | * | 9/2003 | Roberts et al. | 280/743.1 |
| 2004/0232666 | A1 | | 11/2004 | Sato et al. | |
| 2006/0043702 | A1 | * | 3/2006 | Jamison | 280/729 |

(Continued)

FOREIGN PATENT DOCUMENTS

| JP | 2008-201172 | 9/2008 |
|---|---|---|
| JP | 2011-1051 | 1/2011 |

*Primary Examiner* — Ruth Ilan
*Assistant Examiner* — Barry Gooden, Jr.
(74) *Attorney, Agent, or Firm* — Smith, Gambrell & Russell, LLP (57) ABSTRACT

A side airbag apparatus includes an airbag that can form a plurality of chambers with a single inflator and protects an occupant from an impact on a side door by deploying the airbag between the occupant and the side door. The chambers of the airbag includes a vehicle sidewall chamber that can be deployed around a shoulder region of the occupant and a compartment chamber that is disposed closer to the inner side of an occupant compartment in the vehicle width direction than the vehicle sidewall chamber and can be deployed around a chest region of the occupant.

4 Claims, 8 Drawing Sheets

(56) References Cited

U.S. PATENT DOCUMENTS

| | | | |
|---|---|---|---|
| 2006/0131847 A1* | 6/2006 | Sato et al. ................ | 280/730.2 |
| 2009/0001695 A1 | 1/2009 | Suzuki et al. | |
| 2010/0264630 A1 | 10/2010 | Walston | |
| 2011/0169250 A1 | 7/2011 | Breuninger et al. | |
| 2011/0241322 A1 | 10/2011 | Nozaki et al. | |
| 2012/0217731 A1 | 8/2012 | Baba et al. | |

* cited by examiner

FIG. 6

OCCUPANT PROTECTION APPARATUS AND OCCUPANT PROTECTION METHOD

CROSS REFERENCES TO RELATED APPLICATIONS

The present application claims priority from Japanese Patent Application No. 2011-042650 filed on Feb. 28, 2011, the entire contents of which are hereby incorporated by reference.

BACKGROUND OF THE INVENTION

1. Field of the Invention

The present invention relates to occupant protection apparatuses and occupant protection methods, particularly relates to an occupant protection apparatus and an occupant protection method that have an airbag in which a plurality of chambers can be formed with a single inflator and protect an occupant from a shock of a side impact on a vehicle sidewall by deploying the airbag between a vehicle sidewall and the occupant.

2. Description of the Related Art

An occupant protection apparatus usually have an airbag in which a single chamber is formed with a single inflator and protects an occupant from a shock of a side impact on a vehicle sidewall by deploying the airbag between a vehicle sidewall and the occupant.

As for the enhancement of occupant safety against a side impact by securing a space between the vehicle sidewall and the occupant, since the vehicle sidewall shifts towards an occupant compartment in the vehicle width direction upon a side impact, the airbag is deployed between the vehicle sidewall and the occupant so as to prevent the vehicle sidewall from contacting with the occupant.

Such an occupant protection apparatus having an airbag in which a single chamber is formed with a single inflator can secure a space between the vehicle sidewall and the occupant by, for example, increasing the thickness of the airbag in the vehicle width direction, whereby occupant safety against a side impact can be enhanced.

However, if the thickness of the airbag is increased in the vehicle width direction, the airbag may hit a component such as a door arm rest disposed in the space between the vehicle sidewall and the occupant upon the deployment of the airbag. Therefore, the airbag cannot be reliably deployed between the vehicle sidewall and the occupant should be addressed.

For this problem, the airbag is less likely to hit the component in the space if the thickness of the airbag in the vehicle width direction is decreased. However, a space cannot be secured between the vehicle sidewall and the occupant.

As a countermeasure for reliably deploying the airbag between the vehicle sidewall and the occupant and securing the space between the vehicle sidewall and the occupant, a plurality of side airbag apparatuses could be used, for example.

However, if a plurality of side airbags apparatuses is used, an additional component such as a control unit is required to control the timing of deploying each airbag, whereby the entire configuration becomes complicated.

The addition of the component such as a control unit also leads to cost increase. Moreover, when a plurality of airbag apparatuses is used, the airbags thereof may interfere with each other.

Recently, therefore, in order to achieve an occupant protection apparatus with a simple configuration, there have been needs to an occupant protection apparatus that has an airbag in which a plurality of chambers can be formed with a single inflator and secures a space between an occupant and a vehicle sidewall by reliably deploying the chambers.

In order to achieve an occupant protection apparatus with a simple configuration, for example, Japanese Unexamined Patent Application Publication (JP-A) No. 2008-201172 discloses a side airbag apparatus that has a high-pressure bag and a low pressure bag that are deployed by a single inflator. When the bags deployed, the high-pressure bag is deployed first, and then the low pressure bag is deployed.

In addition, JP-A No. 2011-001051 discloses a side airbag apparatus that has an upper chamber configured to be deployed towards above an arm rest and a lower chamber configured to be deployed towards below the arm rest.

Since the side airbag apparatus according to JP-A No. 2008-201172 deploys the high-pressure bag and the low-pressure bag with the single inflator and protects a chest region of the occupant by the low-pressure bag, the high-pressure bag may hit the arm rest. Therefore, the side airbag apparatus according to JP-A No. 2008-201172 should be improved to reliably deploy the high-pressure bag.

In addition, while the side airbag apparatus according to JP-A No. 2011-001051 deploys the upper and lower chambers such that they do not hit the arm rest, the chambers do not protect the chest region of the occupant.

Accordingly, the side airbag apparatus according to JP-A No. 2011-001051 presses a shoulder region and a buttock region of the occupant using the upper and lower chambers. Since the side airbag apparatus according to JP-A No. 2011-001051 do not press a chest region of the occupant, a chest injury criterion may become higher.

Thus, since the side airbag apparatus according to JP-A No. 2011-001051 does not press a shoulder region and a buttock region of the occupant evenly using the upper and lower chambers, and thus a chest injury criterion may become higher as described above, a countermeasure should be taken to reduce the chest injury criterion.

SUMMARY OF THE INVENTION

The present invention is made in view of the above, and it is an object of the present invention to provide an occupant protection apparatus and an occupant protection method that has an airbag in which a plurality of chambers can be formed with a single inflator to enhance safety upon protecting an occupant from a shock of a side impact on a sidewall by securing a space between a vehicle sidewall and an occupant and reducing a chest injury criterion.

In order to solve the above-mentioned problems, an aspect of the present invention provides an occupant protection apparatus that includes an airbag in which a plurality of chambers can be formed with a single inflator, and protects an occupant from a shock of a side impact on a vehicle sidewall by deploying the airbag between the vehicle sidewall and the occupant. The plurality of chambers of the airbag includes a vehicle sidewall chamber that can deployed around a shoulder region of the occupant, and a compartment chamber that is disposed closer to the inner side of an occupant compartment in the vehicle width direction than the vehicle sidewall chamber and can be deployed around a chest region of the occupant.

Preferably, the vehicle sidewall chamber of the occupant protection apparatus according to the present invention should be capable of being deployed from the shoulder region to a buttock region of the occupant.

Preferably, the vehicle sidewall chamber and the compartment chamber of the occupant protection apparatus according to the present invention should have a contact surface where they contact each other upon deployment along a deployment direction.

Preferably, the inflator of the occupant protection apparatus according to the present invention should be disposed at the vehicle sidewall chamber of the airbag. The airbag should include a communication section that is capable of providing supply gas provided to the vehicle sidewall chamber by the inflator to the compartment chamber from the vehicle sidewall chamber.

Preferably, the airbag of the occupant protection apparatus according to the present invention should include a pressure valve that releases the communication section when a pressure of the supply gas reaches a predetermined pressure in the vehicle sidewall chamber.

Preferably, the airbag of the occupant protection apparatus according to the present invention should include a vent hole for discharging the supply gas to the outside only at the compartment chamber.

In order to solve the above-mentioned problems, further another aspect of the present invention provides an occupant protection method that protects an occupant from a shock of a side impact on a vehicle sidewall by deploying an airbag between the vehicle sidewall and the occupant, the airbag including a plurality of chambers that are formed with a single inflator. At least one of the chambers should be deployed from a shoulder region to a buttock region of the occupant, and at least another of the chambers should be deployed around a chest region of the occupant.

DESCRIPTION OF THE PREFERRED EMBODIMENTS

Embodiments of the present invention will hereunder be described with reference to the drawings.

Embodiment 1

FIGS. 1 to 4C relate to a side airbag apparatus 10 according to an embodiment of the present invention. The side airbag apparatus 10 has an airbag 12 that can form a plurality of chambers with a single inflator 11. An occupant is protected from a shock of a side impact on a side door 20 (vehicle sidewall) by deploying the airbag 12 between the side door 20 and the occupant.

Thus, the side airbag apparatus 10 according to the present embodiment corresponds to an occupant protection apparatus of the present invention. A method of protecting the occupant with the side airbag apparatus 10 corresponds to an occupant protection method of the present invention.

Figure 1:
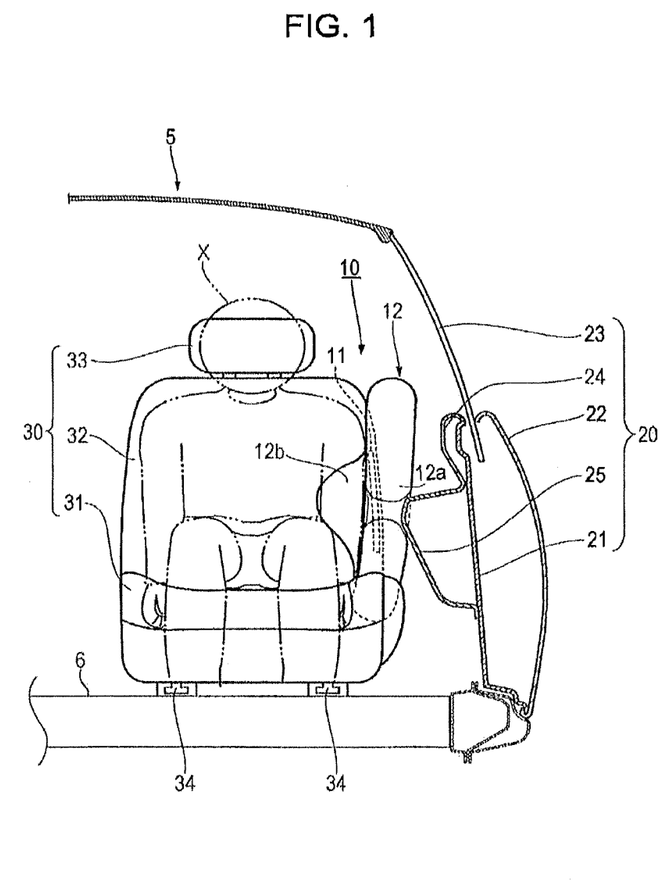
FIG. 1 shows a side door and a vehicle seat of a vehicle provided with an occupant protection apparatus according to an embodiment of the present invention and schematically shows a state in which an airbag of the side air bag apparatus is deployed from a front side of the vehicle.

Firstly, the side door 20 and a vehicle seat 30 of a vehicle 5 provided with the side airbag apparatus 10 according to the present embodiment will be described with reference to FIGS. 1 and 2. FIG. 1 shows the side door 20 and the vehicle seat 30 of the vehicle 5 provided with the side airbag apparatus 10 according to the present embodiment, and schematically shows the vehicle 5 a state in which the side airbag 12 of the side airbag apparatus 10 is deployed. The view is seen from a front side of the vehicle 5.

Figure 2:
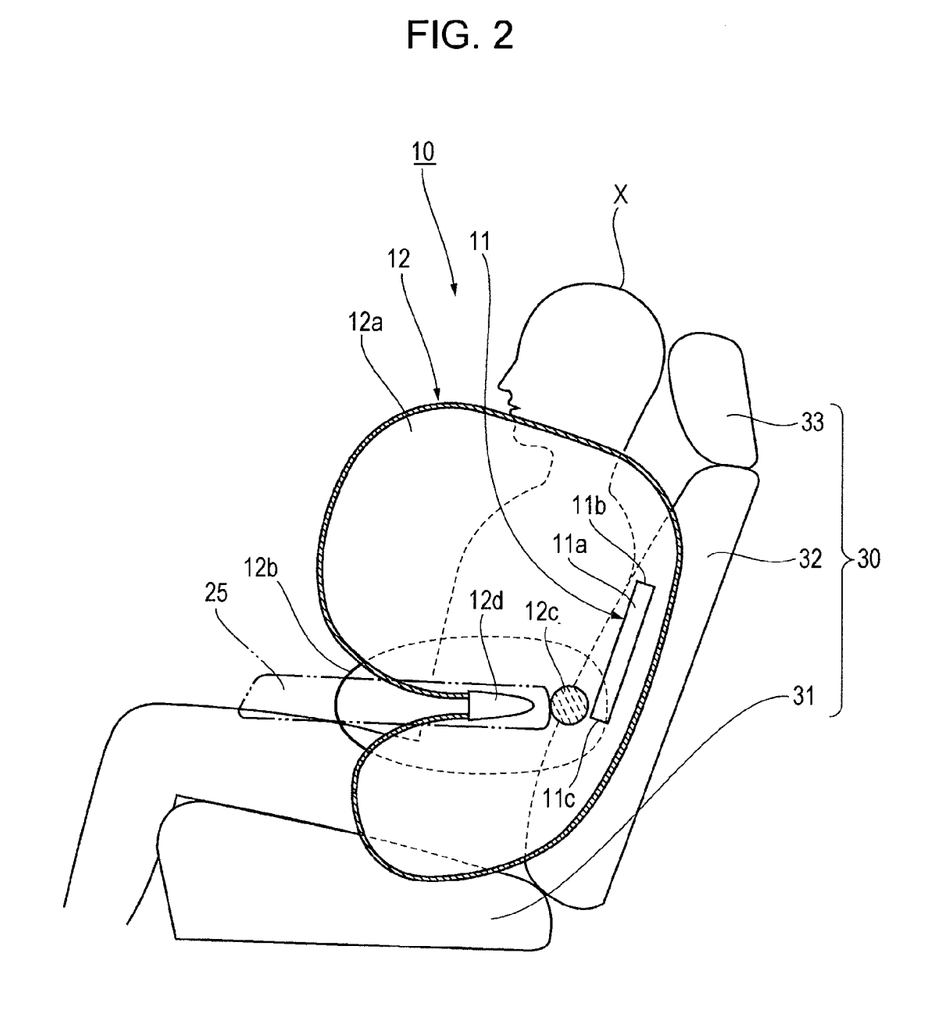
FIG. 2 shows the side door and the vehicle seat of the vehicle provided with the occupant protection apparatus according to the FIG. 1 embodiment of the present invention, but with an indent in the vehicle side wall chamber, and schematically shows the state in which the occupant protection apparatus is deployed from a lateral side of the vehicle.

FIG. 2 shows the side door 20 and the vehicle 30 of the vehicle 5 provided with the side airbag apparatus 10 according to the present embodiment, and schematically shows the vehicle 5 the state in which the side airbag 12 of the side airbag apparatus 10 is deployed. The view is seen from a lateral side of the vehicle 5.

As shown in FIGS. 1 and 2, the side door 20 of the present embodiment includes an inner panel 21 and an outer panel 22 that are part of a frame of the side door 20.

The side door 20 further includes a window glass 23 that is disposed between the inner panel 21 and the outer panel 22 and can vertically move therebetween in the vehicle vertical direction.

The inner panel 21, which is part of the side door 20, has attached thereto a door trim 24 at the occupant-compartment-side in the vehicle width direction. The door trim 24A door has disposed therein an arm rest 25 that protrudes towards the occupant compartment in the vehicle width direction. The vehicle seat 30 on which an occupant is to sit is disposed on the occupant-compartment side of the door arm rest 25.

The vehicle seat 30 includes a seat cushion 31 on which the occupant is to sit and a seat back 32 on which the occupant is to lean. The seat back 32 is disposed at a posterior end of the seat cushion 31 in the vehicle longitudinal direction. The vehicle seat 30 further includes a head rest 33 that is disposed at an upper end of the seat back 32 in the vehicle vertical direction.

The seat cushion 31 is attached on a floor 6 of the vehicle 5 slidably in the vehicle longitudinal direction via a sliding mechanism 34. Thus, when an occupant uses the vehicle seat 30, the occupant can slide the vehicle seat 30 in the longitudinal direction of the vehicle according to the occupant's preference. As described above, the seat back 32 is disposed at the posterior end of the seat cushion 31.

The seat back 32 is attached to the seat cushion 31 via an unillustrated reclining mechanism. Thus, when an occupant uses the vehicle seat 30, the occupant can stand up or lay down the seat back 32 in the vehicle longitudinal direction according to the occupant's preference.

The side airbag apparatus 10 is disposed at a side-door-20-side end of the seat back 32 in the vehicle width direction. Specifically, since the side airbag apparatus 10 aims to secure a space between the vehicle sidewall and the occupant by deploying the airbag 12 therebetween as described above, the airbag 12 is deployed forward in the vehicle longitudinal direction.

In the present embodiment, the side airbag apparatus 10 includes the inflator 11 as a gas ejector and the airbag 12 that is connected to the inflator 11 and deployed with gas ejected from the inflator 11. The side airbag apparatus 10 further includes an unillustrated case for housing the inflator 11 and the airbag 12

The side airbag apparatus 10 is attached to an unillustrated frame of the seat back 32. The frame has a cover covering thereof. Thus, the side airbag apparatus 10 is embedded inside the seat back 32.

The side airbag apparatus 10 further includes an unillustrated sensor that detects a shock due to a side impact on the side door 20. The sensor is connected to an unillustrated control circuit. The control circuit controls the inflator 11 based on a detection signal from the sensor.

The inflator 11 of the present embodiment is disposed in a vehicle sidewall chamber 12a to be described later. The inflator 11 includes an inflator case 11a disposed in the vehicle sidewall chamber 12a along the vehicle vertical direction and an unillustrated explosive contained in the inflator case 11a.

The inflator case 11a includes a first gas supply port 11b and a second gas supply port 11c that are disposed at ends of the inflator case 11a in the axial direction and eject supply gas generated in the inflator case 11a into the airbag 12.

Thus, the gas supply direction of the first gas supply port 11b of the inflator 11 is disposed so as to provide supply gas to an upper side of the vehicle sidewall chamber 12a in the vehicle vertical direction. The gas supply direction of the second gas supply port 11c of the inflator 11 is disposed so as to provide supply gas to a lower side of the compartment chamber 12a in the vehicle vertical direction.

The side airbag apparatus 10 may include an unillustrated inner tube that changes the ejecting direction of supply gas ejected from the first and second gas supply ports 11b and 11c of the inflator 11 according to a deployment state of the airbag 12.

Thus, the side airbag apparatus 10 initiates the deployment of the airbag 12 by providing supply gas into the airbag 12 with the inflator 11 controlled by the control circuit.

While the airbag 12 is to be deployed between the side door 20 and the occupant sitting on the vehicle seat 30 by supply gas provided by the inflator 11 as described above, it is housed in the case at normal times.

Specifically, the airbag 12 of the present embodiment is housed in the case such that it is folded in a rolled state. However, the present invention is not limited to this. Alternatively, for example, the airbag 12 may be housed such that it is folded in a concertina shape.

The airbag 12 is formed in a pouched shape by sewing the outer peripheral edges of a pair of base fabric pieces that are made with fire-proofed woven cloth. However, the present invention is not limited to this. Alternatively, for example, the airbag 12 may be formed in a pouched shape by adhering or welding the outer peripheral edges of a pair of base fabric pieces.

In the present embodiment, the airbag 12 includes the vehicle sidewall chamber 12a that can deployed around a shoulder region of an occupant and a compartment chamber 12b that is disposed closer to the inner side of the occupant compartment in the vehicle width direction than the vehicle sidewall chamber 12a and can be deployed around a chest region of the occupant.

In order to be capable of being deployed around the shoulder region of the occupant, the vehicle sidewall chamber 12a is configured such that the width thereof upon deployment is smaller than a distance between the door arm rest 25 and the shoulder region of the occupant. Here, the distance between the door arm rest 25 and the shoulder region of the occupant is the smallest distance between the side door 20 and the occupant.

Accordingly, since the airbag 12 of the present embodiment is configured such that the width of the vehicle sidewall chamber 12a is smaller than the smallest distance between the side door 20 and the occupant, the vehicle sidewall chamber 12a can be deployed between the side door 20 and the occupant such that it does not hit the door arm rest 25 or the like.

As described above, the vehicle sidewall chamber 12a of the airbag 12 according to the present embodiment is to be deployed around the shoulder region of the occupant. Thus, upon deployment, the vehicle sidewall chamber 12a presses the shoulder region of the occupant, but does not press a chest region of the occupant.

In other words, the vehicle sidewall chamber 12a of the airbag 12 does not evenly press the shoulder region and the chest region of the occupant. Therefore, a chest injury criterion may become higher in the airbag 12.

Accordingly, in addition to the vehicle sidewall chamber 12a, the airbag 12 of the side airbag apparatus 10 of the present embodiment includes the compartment chamber 12b that can be deployed around the chest region of the occupant so that the airbag 12 can evenly press the shoulder region and the chest region of the occupant.

The vehicle sidewall chamber 12a and the compartment chamber 12b have a contact surface where they contact each other upon deployment in the deployment direction. The contact surface is provided with a communication section that connects the vehicle sidewall chamber 12a and the compartment chamber 12b. As shown in FIG. 2, there is an uninflated part 12d between the upper and lower sections of the vehicle sidewall chamber 12a and forward of pressure valve 12c.

The communication section includes a pressure valve 12c that releases the communication section when a pressure of supply gas provided to the vehicle sidewall chamber 12a by the inflator 11 reaches a predetermined pressure in the vehicle sidewall chamber 12a.

The pressure valve 12c is made of a fabric piece that is thinner than the base fabric pieces of the airbag 12. Thus, the pressure valve 12c is torn when supply gas is provided to the vehicle sidewall chamber 12a by the inflator 11 and the pressure therein becomes high.

After the pressure valve 12c is torn, supply gas is provided to the compartment chamber 12b as well as the vehicle sidewall chamber 12a by the inflator 12.

Further, the airbag 12 has a vent hole V only at the compartment chamber 12b, Thus, supply gas provided to the vehicle sidewall Chamber 12a and the compartment chamber 12b is discharged from the compartment chamber 12b to the outside.

Since supply gas is discharged from the compartment chamber 12b to the outside, upon contraction, the compartment chamber 12b contracts first. Accordingly, in the airbag 12, the pressure in the compartment chamber 12b can become low earlier than that in the vehicle sidewall chamber 12a.

Thus, in the airbag of the present embodiment, while the vehicle sidewall chamber 12a presses the shoulder region of the occupant and the compartment chamber 12b presses the chest region of the occupant, the pressure in the compartment chamber 12b is made low, whereby the chest injury criterion can be reduced upon depression.

In the above description, the pressure valve 12c of the present embodiment is made of the fabric piece that is thinner than the base fabric pieces of the airbag 12. However, the present invention is not limited to this embodiment. Alternatively, for example, the pressure valve 12c may be made of a same fabric piece as the airbag 12 by sewing it loosely with large stitches.

Accordingly, the pressure valve 12c becomes unfastened when supply gas is provided to the vehicle sidewall chamber 12a by the inflator 11 and the pressure therein become high.

Since the side airbag apparatus 10 of the present embodiment has the communication section that connects the vehicle sidewall chamber 12a and the compartment chamber 12b, and the supply gas provided by the inflator 11 to the vehicle sidewall chamber 12a and the compartment chamber 12b, both the vehicle sidewall chamber 12a and the compartment chamber 12 can be deployed with the single inflator 11.

Further, since the vehicle sidewall chamber 12a and the compartment chamber 12b of the side airbag apparatus 10 have the contact surface where they contact each other, whereby they are deployed in the same direction.

Specifically, the compartment chamber 12b is configured to be capable of being deployed forward in the vehicle longitudinal direction together with the vehicle sidewall chamber 12a. The vehicle sidewall chamber 12a is configured to be capable of being deployed afterwards, further forward between the door arm rest 25 and the occupant.

The compartment chamber 12b is also configured to be capable of being deployed further towards the inner side of the occupant compartment in the vehicle width direction compared to the vehicle sidewall chamber 12a, that is, further towards the inner side of the occupant compartment compared to the shoulder of the occupant.

As a result, using the single inflator 11, the side airbag apparatus 10 of the present embodiment can secure a space between the door arm rest 25 and the occupant with the vehicle sidewall chamber 12a as well as protect the chest region of the occupant with the compartment chamber 12b.

Furthermore, in the side airbag apparatus 10 of the present embodiment, the vehicle sidewall chamber 12a and the compartment chamber 12b are deployed in the same direction, whereby the thickness of the compartment chamber 12b in the vehicle width direction can be decreased, and thus the size of the compartment chamber 12b can be made smaller.

Furthermore, the side airbag apparatus 10 of the present embodiment can evenly press the shoulder region and the chest region of the occupant with vehicle sidewall chamber 12a and the compartment chamber 12b, whereby the chest injury criterion can be reduced.

Furthermore, the side airbag apparatus 10 serves a protective function for the chest region of the occupant by deploying the compartment chamber 12b therearound. Accordingly, the side airbag apparatus 10 can enhance safety upon protecting the occupant from the shock of a side impact on the side door 20.

As described above, upon a side impact on the side door 20, the side airbag apparatus 10 according to the present embodiment, which includes the airbag 12 which forms the vehicle sidewall chamber 12a and the compartment chamber 12b with the single inflator 11, secures a space between the side door 20 and the occupant, and protects the chest region of the occupant by the use of the vehicle sidewall chamber 12a and the compartment chamber 12b, whereby safety upon protecting the occupant from the shock of a side impact on the side door 20 can be enhanced.

Furthermore, the side airbag apparatus 10 of the present embodiment does not use another inflator other than the inflator 11 to deploy the airbag 12 to the chest region of the occupant where airbag deployment is difficult. In other words, the side airbag apparatus 10 can deploy the airbag 12 to a difficult region with a simple configuration. As a result, the side airbag apparatus 10 can achieve cost reduction.

Figure 3A:
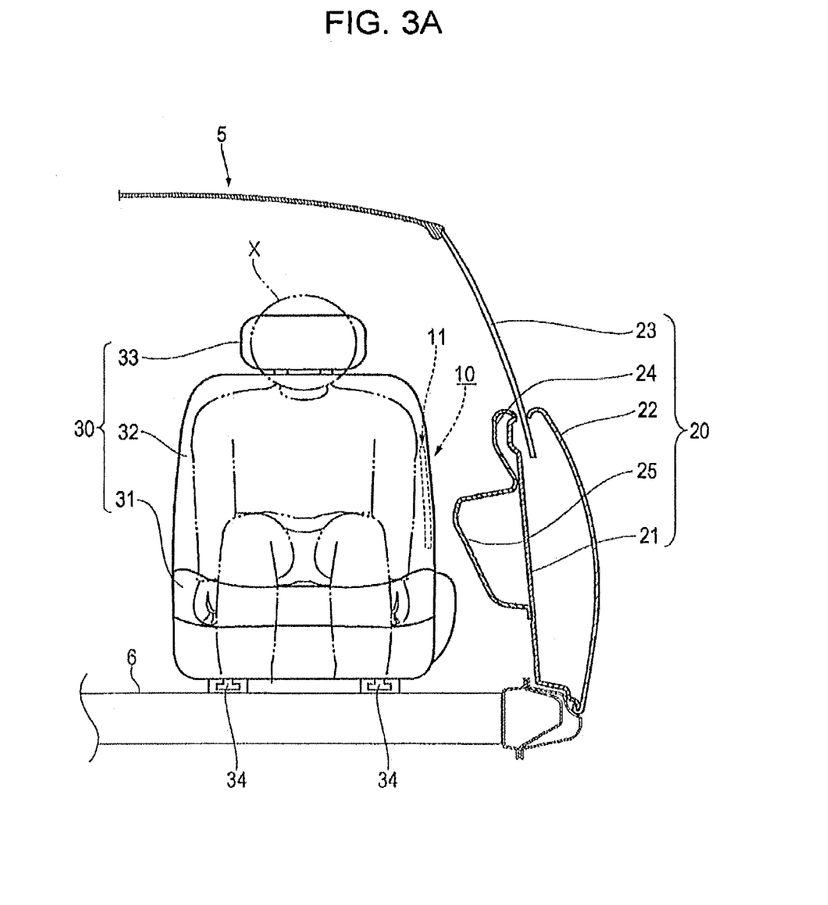
FIG. 3A schematically shows a first state of the occupant protection apparatus according to the embodiment of the present invention from the front side of the vehicle.
Figure 3B:
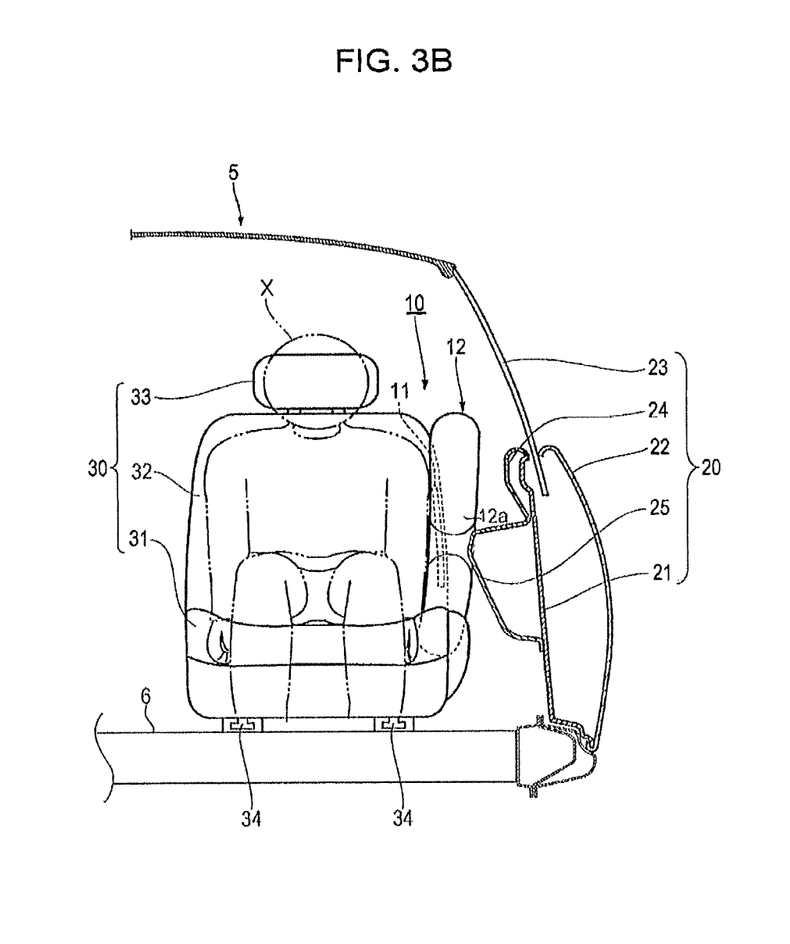
FIG. 3B schematically shows a second state of the occupant protection apparatus according to the embodiment of the present invention from the front side of the vehicle.
Figure 3C:
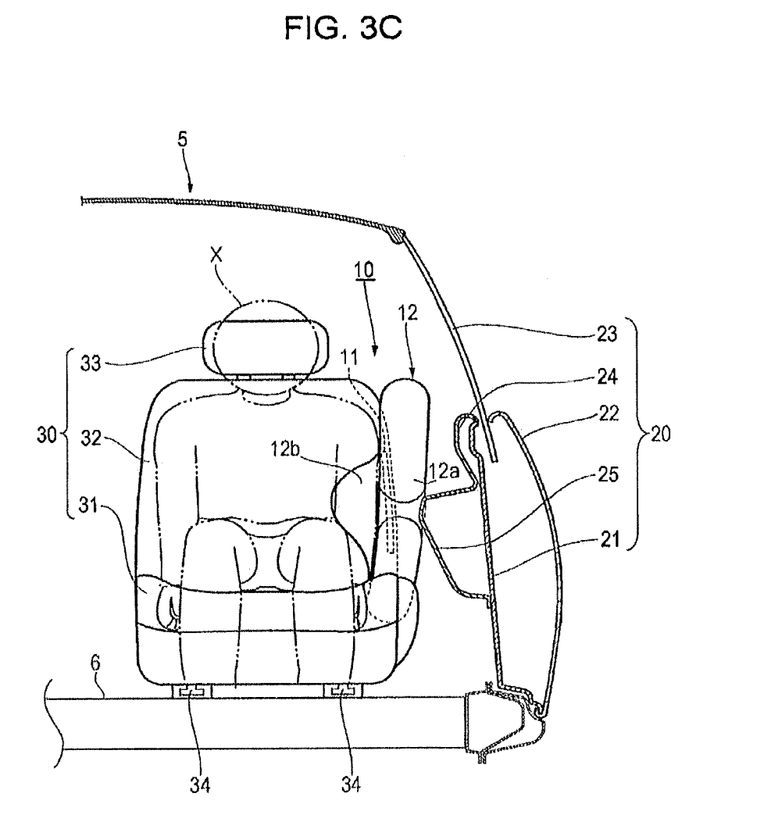
FIG. 3C schematically shows a third state of the occupant protection apparatus according to the embodiment of the present invention from the front side of the vehicle.

Next, the operation of the side airbag apparatus 10 of the present embodiment as well as a method of protecting the occupant therewith will be explained with reference to FIGS. 3A, 3B, 3C, 4A, 4B and 4C. FIG. 3A schematically shows a first state of the side airbag apparatus 10 according to the present embodiment. The view is seen from a front side of the vehicle. FIG. 3B schematically shows a second state of the side airbag apparatus 10 according to the present embodiment. The view is seen from the front side of the vehicle. FIG. 3C schematically shows a third state of the side airbag apparatus 10 according to the present embodiment. The view is seen from the front side of the vehicle.

Figure 4A:
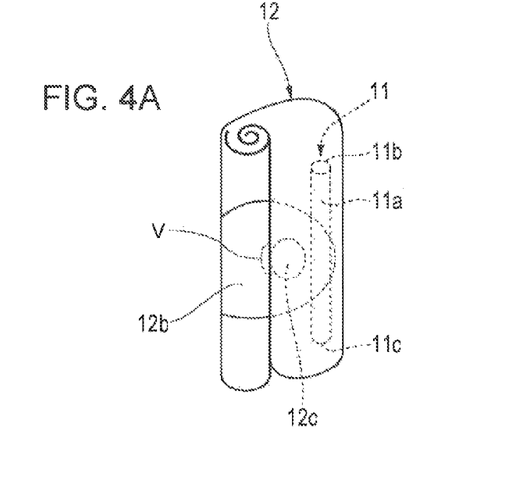
FIG. 4A is a perspective view schematically showing the first state of the occupant protection apparatus according to the embodiment of the present invention.
Figure 4B:
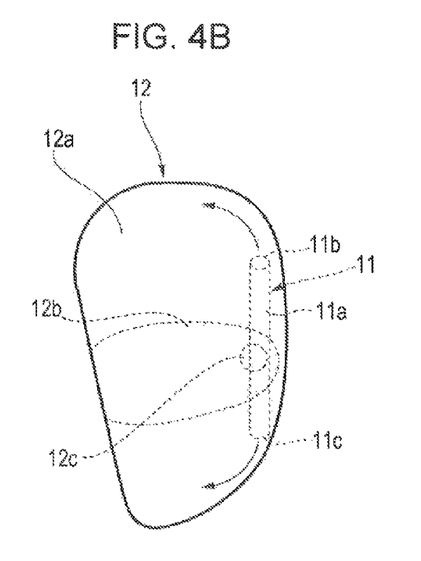
FIG. 4B is a perspective view schematically showing the second state of the occupant protection apparatus according to the embodiment of the present invention.
Figure 4C:
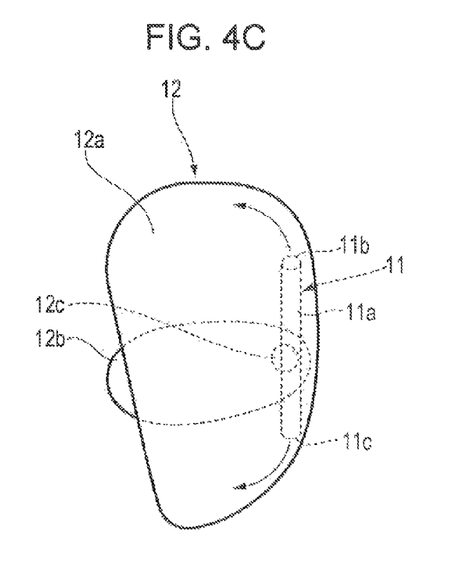
FIG. 4C is a perspective view schematically showing the third state of the occupant protection apparatus according to the embodiment of the present invention.

FIG. 4A is a perspective view schematically showing the first state of the airbag 12 of the side airbag apparatus 10 according to the present embodiment. FIG. 4B is a perspective view schematically showing the second state of the airbag 12 of the side airbag apparatus 10 according to the present embodiment. FIG. 4C is a perspective view schematically showing the third state of the airbag 12 of the side airbag apparatus 10 according to the present embodiment.

As exemplified in FIGS. 3A and 4A, at normal times the airbag 12 of the side airbag apparatus 10 is housed in an unillustrated case such that it is folded in a rolled state. However, this present invention is not limited to this. Alternatively, for example, the airbag 12 of the present embodiment may be housed such that it is folded in a concertina shape.

As exemplified in FIGS. 3B and 4B, when the unillustrated sensor detects an impact larger than a predetermined magnitude due to a side impact on the side door 20, the unillustrated control circuit provides an actuating signal to the inflator 11.

Acknowledging the actuating signal from the control circuit, the inflator 11 provides supply gas into the airbag 12, whereby the deployment of the airbag 12 is initiated. Since the inflator 11 in disposed in the vehicle sidewall chamber 12a, the vehicle sidewall chamber 12a is deployed first.

Supply gas is provided from the first gas supply port 11b of the inflator 11 to the upper side of the vehicle sidewall chamber 12a in the vehicle vertical direction and from the second gas supply port 11c to the lower side of the vehicle sidewall chamber 12a.

The vehicle sidewall chamber 12a is configured such that the width thereof in the vehicle width direction is smaller than the distance between the door arm rest 25 and the shoulder region of the occupant. Accordingly, the side airbag apparatus 10 can deploy the vehicle sidewall chamber 12a such that it does not hit the door arm rest 25, whereby the vehicle sidewall chamber 12a can be reliably deployed.

As exemplified in FIGS. 3C and 4C, the pressure valve 12c of the airbag 12 in the present embodiment is released when the pressure in the vehicle sidewall chamber 12a becomes high due to the supply gas provided by the inflator 11.

Due to the release of the pressure valve 12 of the airbag 12, supply gas is provided to the compartment chamber 12b by the inflator 11. The vehicle sidewall chamber 12a and the compartment chamber 12b have a contact surface where they contact each other at this time in the deployment direction thereof.

Accordingly, the vehicle sidewall chamber 12a and the compartment chamber 12b are deployed in the same direction. As described above, the sidewall chamber 12a is also deployed forward in the vehicle longitudinal direction. Thus, the compartment chamber 12b is also deployed forward in the vehicle longitudinal direction together with the sidewall chamber 12a.

As a result, since the sidewall chamber 12a is deployed around the chest region of the occupant, a space can be secured between the side door 20 and the occupant. In addition, since the compartment chamber 12b is deployed around the chest region of the occupant, it is possible to evenly press the shoulder region and the chest region of the occupant together with the vehicle sidewall chamber 12a and to protect the chest region of the occupant.

As described above, the side airbag apparatus 10 according to the present invention can evenly press the shoulder region and the chest region of the occupant and can protect the chest region of the occupant, whereby the chest injury criterion can be reduced, resulting in the enhancement of safety against a side impact.

Furthermore, since the side airbag apparatus 10 according to the present invention firstly deploys the vehicle sidewall chamber 12a and then deploys the compartment chamber 12b, and has the vent hole only in the compartment chamber 12b, the side airbag apparatus 10 can deploy the compartment chamber 12b with a lower pressure compared to the vehicle sidewall chamber 12a.

Since the side airbag apparatus 10 can deploy the compartment chamber 12b with a low pressure, a pressing force applied onto the occupant by the compartment chamber 12b can be reduced.

As a result, according to the side airbag apparatus 10, it is possible to reduce the chest injury criterion of the compartment chamber 12b to the occupant, whereby safety against a side impact on the side door 20 can be enhanced.

As described above, the side airbag apparatus 10 according to the present embodiment includes the airbag 12 which can deploy the vehicle sidewall chamber 12a and the compartment chamber 12b with the single inflator 11. By the use of the vehicle sidewall chamber 12a and the compartment chamber 12b, a space is secured between the side door 20 and an occupant, and the chest region of the occupant is protected, whereby safety against the shock of a side impact on the side door 20 can be enhanced.

In the present embodiment, the vehicle sidewall chamber 12a is configured to be capable of being deployed around the shoulder region of the occupant. However, the present invention is not limited to this. Alternatively, for example, the vehicle sidewall chamber 12a is configured to be capable of being deployed across from the shoulder region to the buttock region of the occupant.

With this configuration, the side airbag apparatus 10 can evenly press the occupant from across the shoulder region to the buttock region, whereby the chest injury criterion can be further reduced, resulting in the enhancement of safety against a side impact.

Embodiment 2

Figure 5:
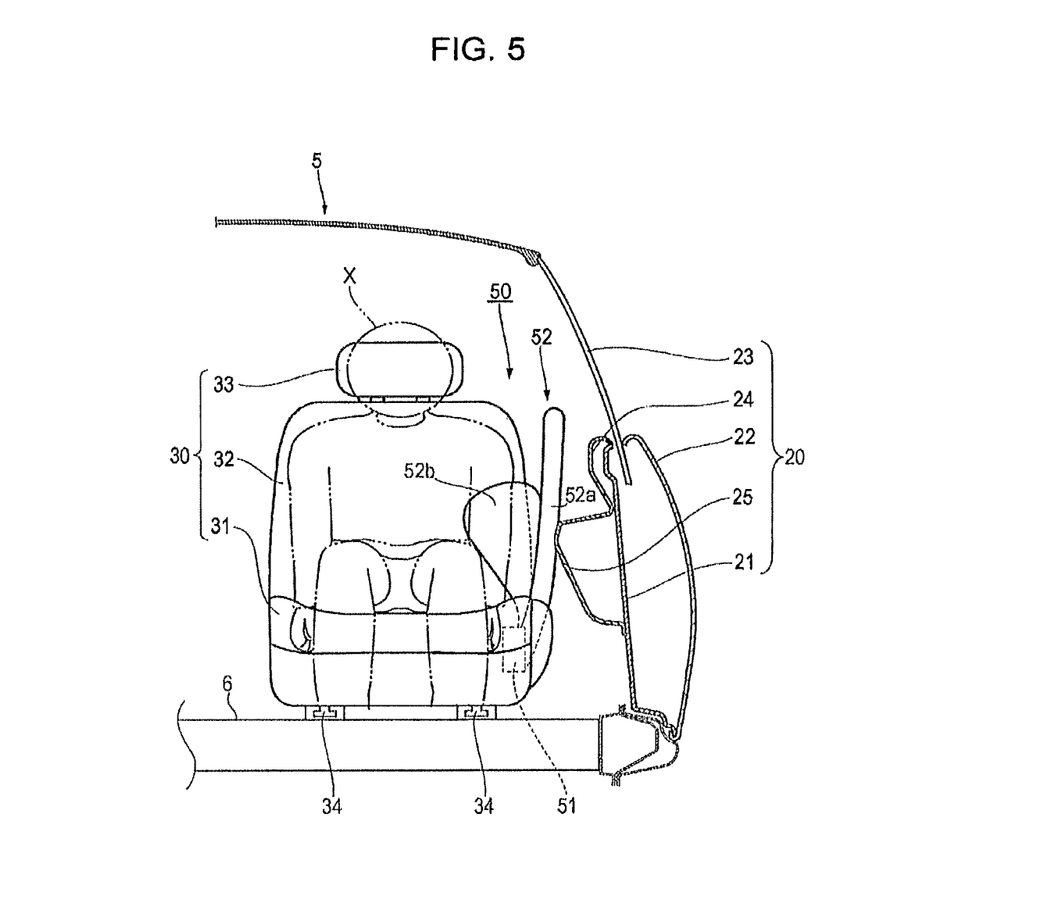
FIG. 5 shows a side door and a vehicle seat of a vehicle provided with an occupant protection apparatus according to another embodiment of the present invention and schematically shows a state in which an airbag of the occupant protection apparatus is deployed from a front side of the vehicle.

Next, another embodiment of the present invention will be described with reference to FIGS. 5 and 6. FIG. 5 shows a side door 20 and a vehicle seat 30 of a vehicle 5 provided with a side airbag apparatus 50 according to the other embodiment of the present invention and schematically shows a state in which an airbag 52 of the side airbag apparatus 50 is deployed. The view is seen from the front side of the vehicle.

Figure 6:
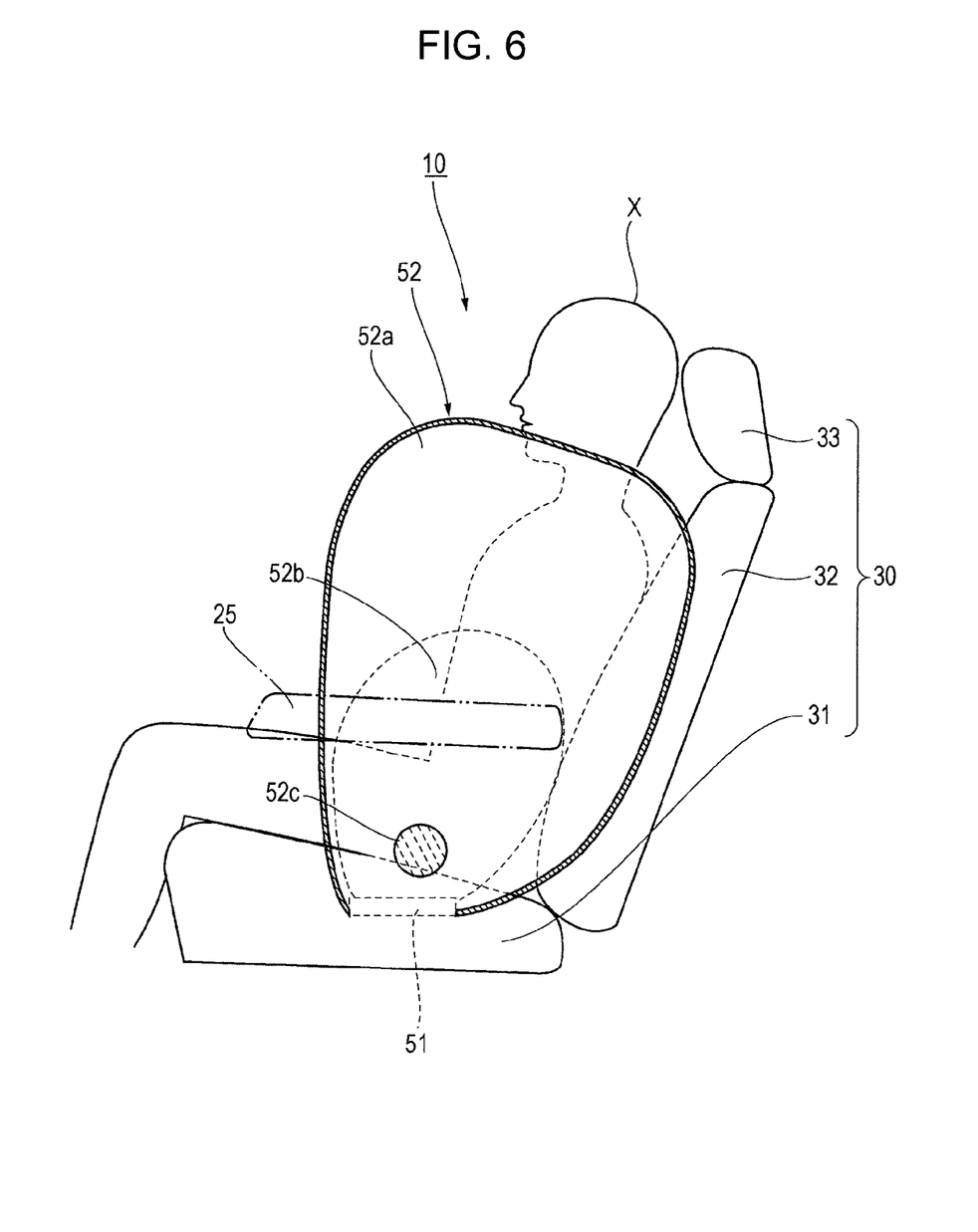
FIG. 6 shows a side door and a vehicle seat of a vehicle provided with the occupant protection apparatus according to the other embodiment of the present invention and schematically shows a state in which an airbag of the occupant protection apparatus is deployed from a lateral side of the vehicle.

FIG. 6 shows the side door 20 and the vehicle seat 30 of a vehicle 5 provided with the side air bag apparatus 50 serving as an occupant protection apparatus according to the another embodiment of the present invention and schematically shows a state in which an airbag of the side air bag apparatus 50 is deployed from a lateral side of the vehicle.

The side airbag apparatus 50 is different from the side airbag apparatus 10 of above-described Embodiment 1 in that the side airbag apparatus 50 is disposed at the seat cushion 31 of the vehicle seat 30. Other features of the configuration of the side airbag apparatus 50 are same as those of the side airbag apparatus 10 (e.g., the pressure valve 52c corresponding with pressure valve 12c in the first embodiment). Therefore, components of Embodiment 2 that are similar to or correspond to those in Embodiment 1 are denoted by like reference numerals and descriptions thereof are omitted.

Since the side airbag apparatus 50 is disposed at the seat cushion 31 of the vehicle seat 30, the airbag 52 of the side airbag apparatus 50 is deployed upward in the vehicle vertical direction, unlike above-described Embodiment 1.

As shown in FIGS. 5 and 6, the side airbag apparatus 50 is disposed at the seat cushion 31 of the vehicle seat 30 as described above. More specifically, the side airbag apparatus 50 is disposed on the side-door-20 side of the seat cushion 31 in the vehicle width direction.

The side airbag apparatus 50 deploys the airbag 52 with the inflator 51 from a side of the seat cushion 31. Thus, a vehicle sidewall chamber 52a can always be deployed in a same space between the side door 20 and the occupant, even if an occupant sits on the vehicle seat 30 with the seat back 32 being stood up or laid down.

Therefore, since the side airbag apparatus 50 can always deploy the vehicle sidewall chamber 52a in the same space between the side door 20 and the occupant, a space can be secured between the side door 20 and the occupant, that is, the occupant can be made away from the side door 20. As a result, safety against shock generated due to a side impact can be enhanced.

What is claimed is:

1. An occupant protection apparatus comprising:
an airbag in which a plurality of chambers can be formed with a single inflator, wherein an occupant is protected from a shock of a side impact on a vehicle sidewall by deploying the airbag between the vehicle sidewall and the occupant; and wherein the plurality of chambers of the airbag comprises:
a vehicle sidewall chamber that is configured for deployment against a shoulder region of the occupant and a buttock region of the occupant, and
the vehicle sidewall chamber having an intermediate portion falling, in a vehicle height direction, between a vehicle sidewall chamber shoulder contact portion and a vehicle sidewall chamber buttock contact portion; and
a compartment chamber that is disposed closer to an inner side of an occupant compartment in a vehicle width direction than the vehicle sidewall chamber and which is configured for contact against a side chest region of the occupant and is disposed as to extend inwardly only out from the intermediate portion of the vehicle sidewall chamber; and
the inflator includes a gas supply port that ejects supply gas generated in the inflator into the airbag; and the vehicle sidewall chamber and the compartment chamber are deployed in a same direction relative to a deployment directed gas flow direction from the gas supply port into the vehicle sidewall compartment, which same direction is different than the vehicle width direction.

2. The occupant protection apparatus of claim 1, wherein, the compartment chamber is configured to have an innermost expansion extension commensurate with the side chest region of the occupant.

3. The occupant protection apparatus according to claim 1, wherein the airbag comprises a communication section that allows the supply gas provided to the vehicle sidewall chamber by the inflator to flow from the vehicle sidewall chamber to the compartment chamber and a pressure valve that releases the communication section when a pressure of the supply gas reaches to a predetermined pressure in the vehicle sidewall chamber.

4. The occupant protection apparatus according to claim 3, wherein the airbag is equipped with a vent hole for discharging the supply gas to an outside only at the compartment chamber.

\* \* \* \* \*